(12) United States Patent
Wang et al.

(10) Patent No.: US 8,291,200 B2
(45) Date of Patent: Oct. 16, 2012

(54) REDUCED POWER LOAD/STORE QUEUE SEARCHING BY COMPARING SUBSETS OF ADDRESS BITS AND ENABLING SECOND SUBSET COMPARISON BASED ON FIRST SUBSET COMPARISON RESULT

(75) Inventors: Kai-Feng Wang, Beijing (CN);
Hong-Xia Sun, Beijing (CN);
Yong-Qiang Wu, Beijing (CN)

(73) Assignee: STMicroelectronics (Beijing) R&D Co., Ltd., Hai Dian District, Beijing (CN)

( * ) Notice: Subject to any disclaimer, the term of this patent is extended or adjusted under 35 U.S.C. 154(b) by 552 days.

(21) Appl. No.: 12/535,615

(22) Filed: Aug. 4, 2009

(65) Prior Publication Data

US 2010/0145969 A1 Jun. 10, 2010

(30) Foreign Application Priority Data

Dec. 5, 2008 (CN) .......................... 2008 1 0246370

(51) Int. Cl.
*G06F 9/312* (2006.01)
*G06F 1/32* (2006.01)
(52) U.S. Cl. .................. 712/225; 711/210; 713/324
(58) Field of Classification Search .................. None
See application file for complete search history.

(56) References Cited

U.S. PATENT DOCUMENTS

| 4,626,843 | A | * | 12/1986 | Szeto et al. | ................... 710/240 |
| 5,752,069 | A |   | 5/1998  | Roberts et al. | |
| 5,812,810 | A |   | 9/1998  | Sagar | |
| 6,449,694 | B1 |  | 9/2002  | Burgess, Jr. et al. | |
| 6,701,425 | B1 | * | 3/2004 | Dabbagh et al. | ............... 712/225 |
| 7,203,081 | B2 | * | 4/2007 | Nishiyama et al. | ......... 365/49.17 |
| 7,599,974 | B2 | * | 10/2009 | Hinds et al. | ................... 708/200 |
| 2008/0082765 | A1 |  | 4/2008 | Hily et al. | |

OTHER PUBLICATIONS

European Search Report dated Apr. 9, 2010 from corresponding European Application No. 09180317.1.
European Search Opinion dated Apr. 9, 2010 from corresponding European Application No. 09180317.1.

* cited by examiner

*Primary Examiner* — Kenneth Kim
(74) *Attorney, Agent, or Firm* — Wolf, Greenfield & Sacks, P.C.

(57) ABSTRACT

A comparison circuit can reduce the amount of power consumed when searching a load queue or a store queue of a microprocessor. Some embodiments of the comparison circuit use a comparison unit that performs an initial comparison of addresses using a subset of the address bits. If the initial comparison results in a match, a second comparison unit can be enabled to compare another subset of the address bits.

28 Claims, 4 Drawing Sheets

REDUCED POWER LOAD/STORE QUEUE SEARCHING BY COMPARING SUBSETS OF ADDRESS BITS AND ENABLING SECOND SUBSET COMPARISON BASED ON FIRST SUBSET COMPARISON RESULT

CROSS REFERENCE TO RELATED APPLICATIONS

This application claims the priority benefit of Chinese patent application number 200810246370.8, filed on Dec. 25, 2008, entitled "REDUCED POWER LOAD/STORE QUEUE SEARCHING MECHANISM," which is hereby incorporated by reference to the maximum extent allowable by law.

BACKGROUND OF THE INVENTION

1. Field of the Invention

The techniques described herein relate generally to microprocessors, and some embodiments in particular relate to reducing power consumption in a load queue and/or a store queue.

2. Discussion of Related Art

Some superscalar microprocessors are capable of executing instructions out of order to improve performance. However, one concern with executing instructions out of order is that a data hazard can be created when different instructions access the same memory location. For example, if a later instruction is executed out of order prior to an earlier instruction, and both instructions access the same memory location, there is a danger that these instructions may process the wrong data to produce an incorrect result.

To address the potential problems of out of order execution, some superscalar processors implement both a load queue and a store queue. In some implementations, a load queue is a data structure that stores addresses and data for completed load instructions that have retrieved data from memory for use by the microprocessor core. In some implementations, a store queue is another data structure that stores addresses and data for store instructions that transfer data from the microprocessor core to memory. The load queue and store queue may maintain the information about load and store instructions until there is no longer the possibility of a data hazard. The load queue and/or store queue may be implemented in the core of a superscalar microprocessor as dedicated data structures for storing information about load instructions and/or store instructions. In some implementations, the load queue and store queue may each be implemented as a dedicated set of registers.

A load queue and store queue can enable a superscalar processor to perform a variety of techniques for improving performance and avoiding data hazards, including techniques such as store-to-load data forwarding, memory disambiguation, and in-order store retirement. Previously, store-to-load data forwarding and memory disambiguation used fully associative, age-prioritized searches of the store queue or load queue to determine whether these queues had an entry that accessed a particular location in memory.

SUMMARY OF THE INVENTION

Some embodiments relate to a comparison circuit that compares a first address with a second address, where the second address is stored in a load queue and/or store queue of a microprocessor. The comparison circuit includes first and second comparison units. The first comparison unit compares a first subset of bits of the first address with a corresponding second subset of bits of the second address to produce a first comparison result indicating whether the first subset of bits is equal to the second subset of bits. The second comparison unit is coupled to the first comparison unit to receive the first comparison result. The second comparison unit is enabled and disabled based on the first comparison result. When the second comparison unit is enabled, the second comparison unit compares a third subset of bits of the first memory address with a corresponding fourth subset of bits of the second address.

Some embodiments relate to a method of comparing a first address with a second address, where the second address is stored in a load queue and/or store queue of a microprocessor. A first subset of bits of the first address is compared with a corresponding second subset of bits of the second address. When the first subset of bits is equal to the second subset of bits, a third subset of bits of the first address is compared with a corresponding fourth subset of bits of the second address.

BRIEF DESCRIPTION OF THE DRAWINGS

In the drawings, each identical or nearly identical component that is illustrated in various figures is represented by a like numeral. For purposes of clarity, not every component may be labeled in every drawing. In the drawings.

DETAILED DESCRIPTION

Figure 1:
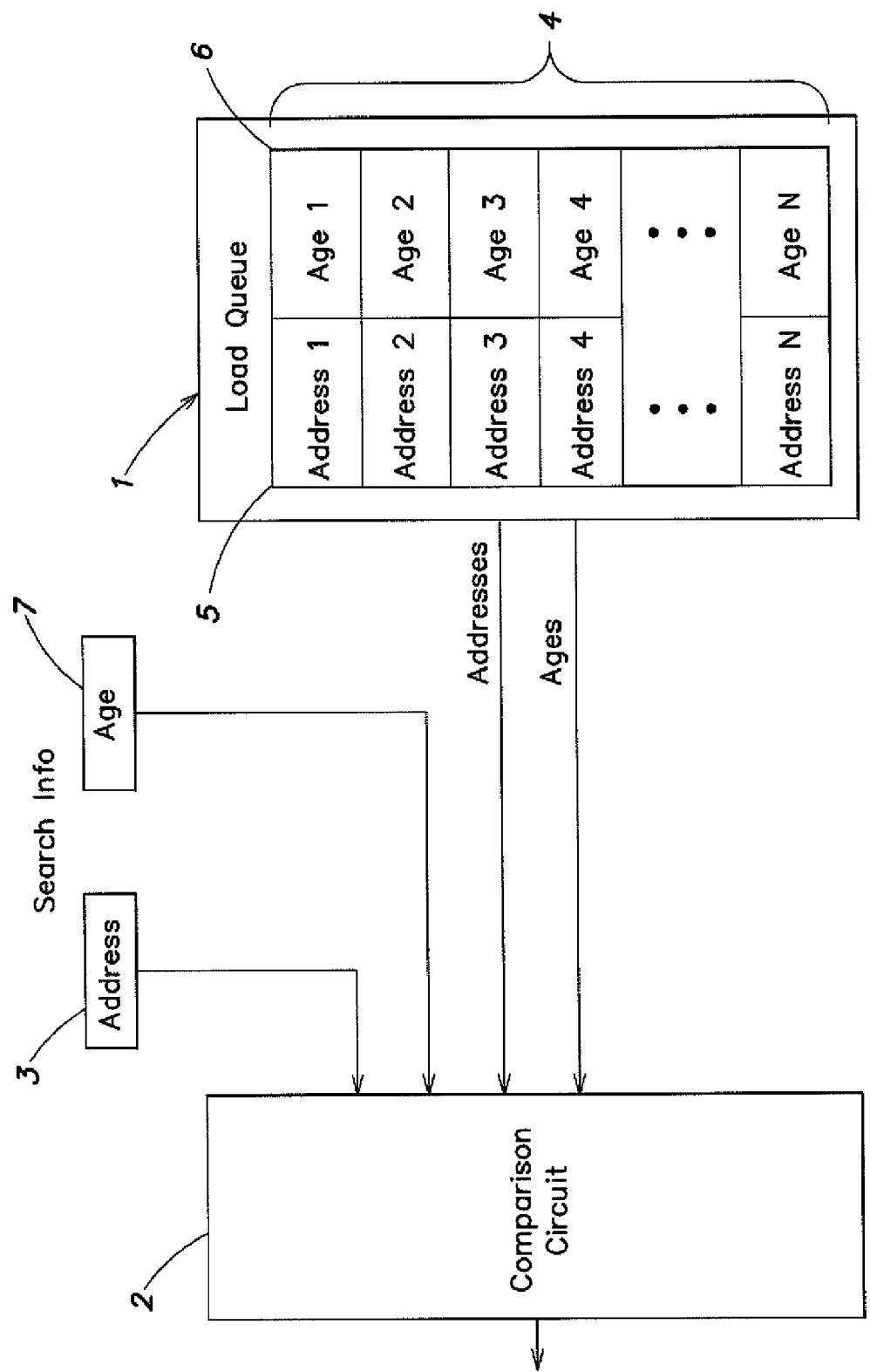
FIG. 1 shows a load queue and a comparison circuit that can search the load queue based on a memory address, according to some embodiments.

As discussed above, prior techniques for searching a microprocessor load queue or store queue used fully associative searches to determine whether a queue had an entry that accessed a particular physical address in memory. In these prior search techniques, an entire memory address was compared with all of the addresses in the load queue or store queue to determine whether there was a matching entry. Each bit of the searched memory address was compared with each bit of the addresses in the queue. However, upon simulation and study of load queue and store queue searches, it has been appreciated that most searches of load queues and store queues do not result in finding an address that matches the searched address. Also, comparing the entire searched address with all of the addresses in the queue can consume a significant amount of power.

In some embodiments, a search of a load queue and/or store queue includes an initial partial comparison of the searched address with the addresses in the queue. This partial comparison can enable early identification of addresses that do not match so that full comparisons of non matching addresses are reduced, which can reduce power consumption in the load queue and/or store queue.

For example, in a first comparison stage, a subset of the bits of the searched address can be compared with the corresponding bits of each address in the queue to determine if any potentially matching addresses are stored in the queue. If the subset of bits matches the corresponding bits of an address in the queue, then the address in the queue is a potential match to the searched address, and the remaining bits of the potentially matching address can be checked in another stage to determine whether the address in the queue fully matches the searched address. Some or all of the addresses in the queue may be eliminated from consideration as potential matches when one or more of the address bits are determined not to match in the first comparison stage. When an addresses in the queue is determined to be unequal to the searched address in the initial comparison stage, it is not necessary to compare further bits of this address with the searched address. The number of bit-wise comparisons performed during the search can be decreased by using an initial comparison stage to filter the queue addresses for potential matches and eliminate non-matching addresses from consideration. Reducing the number of bit-wise comparisons performed during the search can advantageously enable reducing power consumption when searching a load queue and/or a store queue.

As discussed above, a superscalar processor can search for entries in the load queue and/or store queue when performing various operations such as memory disambiguation and load-to-store data forwarding. For example, the load queue can be searched to determine whether there are any pending load instructions corresponding to a particular memory address. When a store instruction is ready to be executed, its address may be used to search the load queue to determine whether there are any mis-speculative load instructions. This search may be performed in an address calculation stage, write-back stage, commit stage and/or any other suitable processing stage. If any mis-speculative load instructions are found, then those load instructions may be re-executed to load the more recent data. However, it has been appreciated that prior techniques for searching load queues and store queues consumed a significant amount of power.

FIG. 1 shows an example of a load queue 1 and a comparison circuit 2 that can determine whether load queue 1 includes a searched address 3, according to some embodiments. Load queue 1 stores multiple entries 4 corresponding to load instructions, and each entry 4 may include a corresponding address 5 and age information 6. Address 5 may represent the physical memory address of a location in memory accessed by the corresponding load instruction. Address 5 can be a binary number having any suitable number of bits, such as thirty-two bits, for example, and searched address 3 may have the same number of bits. Age information 6 may represent the age of the corresponding load instruction.

As discussed above, the load queue 1 may be searched to determine whether there are any entries 4 having an address 5 that matches the searched address 3. In some embodiments, comparison circuit 2 receives the searched address 3 and the addresses 5 of the entries 4 in the load queue. Comparison circuit 2 can compare the searched address 3 with all of the addresses 5 in the load queue to determine whether there are one or more matching addresses. In some embodiments, comparison circuit 2 compares the searched address 3 with an address 5 of the load queue using two or more comparison stages, as discussed in further detail below with respect to FIG. 2. For example, a subset of the bits of the searched address 3 may be compared with the corresponding bits of address 5 in a first comparison stage to determine whether address 5 potentially matches searched address 3. For any addresses 5 that are determined to potentially match the searched address 3, these potentially matching addresses may be further compared with the searched address 3 in one or more additional comparison stages.

In some circumstances, searches may be filtered based on the age of an instruction. For example, if there is a store instruction that accesses an particular address, the load queue may be searched to determine whether there are any load instructions accessing this address that are younger than the store instruction, to determine whether there are any mis-speculative load instructions. Comparison circuit 2 may receive age information 7 corresponding to the searched address 3, and age information 6 corresponding to each load instruction of the load queue 1. When searching for mis-speculative instructions, circuit 2 may use the age information 6, 7 to filter the results of the address comparison to only addresses that are younger than the age represented by age information 7. However, it should be appreciated that any suitable age-related filtering may be performed, if desired, as the techniques described herein are not limited to performing age-related filtering.

Figure 2:
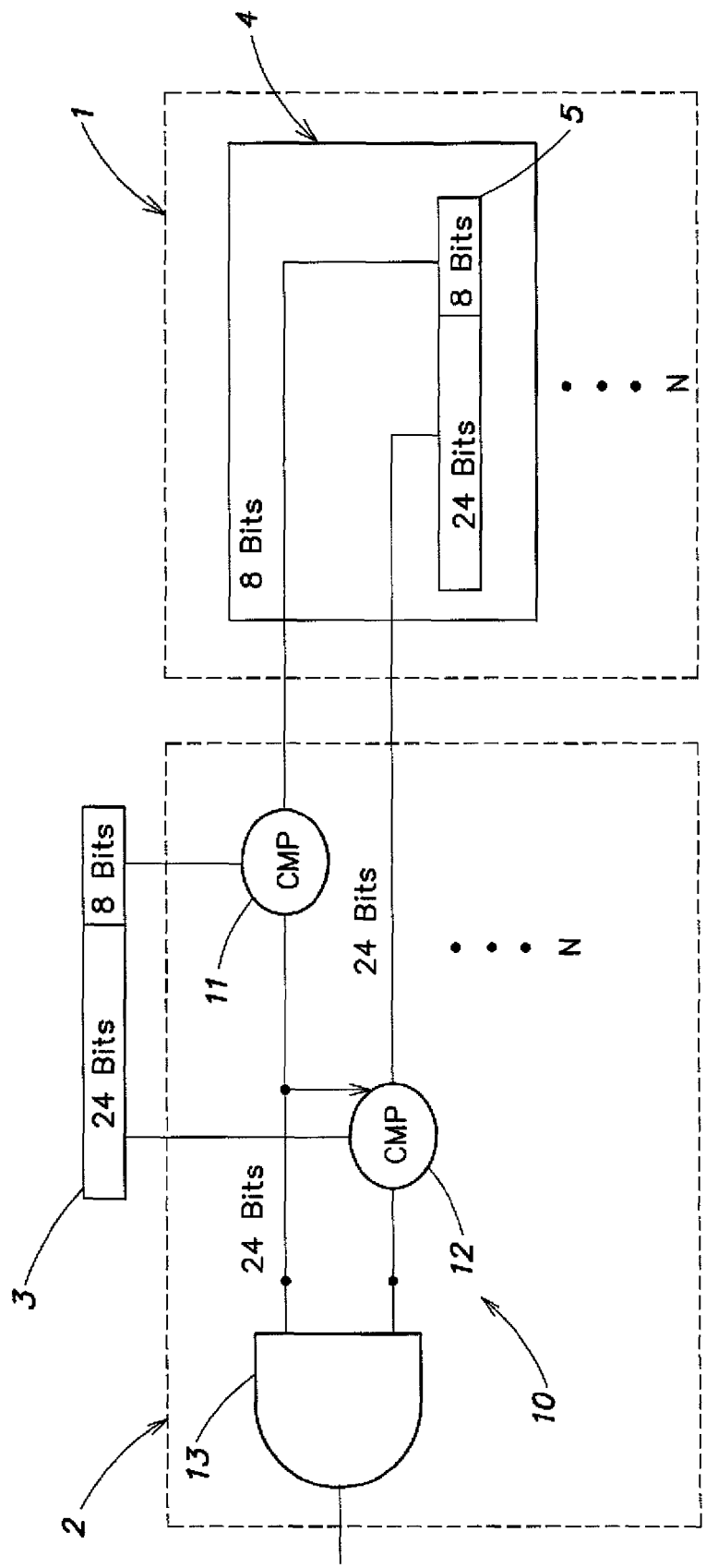
FIG. 2 shows an embodiment of a comparison circuit for a load queue.

FIG. 2 shows a circuit portion 10 of comparison circuit 2, according to some embodiments, for comparing an address 5 of the load queue 1 with a searched address 3. For clarity, only a portion of comparison circuit 2 is shown in FIG. 2. FIG. 2 shows circuit portion 10 of comparison circuit 2 that can compare the searched address 3 with a single address 5 in the load queue 1. However, comparison circuit 2 may include additional circuitry, in some embodiments. For example, if there are N entries 4 in the load queue, then comparison circuit 2 may include N versions of circuit portion 10 for comparing the respective addresses 5 of these entries with the searched address 3.

In the example shown in FIG. 2, the searched address 3 has thirty-two bits, although it should be appreciated that addresses of any suitable number of bits may be used. As illustrated in FIG. 2, searched address 3 has twenty-four most significant bits and eight least significant bits. In the first comparison stage, bit-wise comparison unit 11 compares the eight least significant bits of the searched address 3 with the eight least significant bits of address 5 to determine whether address 5 potentially matches the searched address 3. Bit-wise comparison unit 11 may be a comparator that performs a bit-wise comparison of the bits of the addresses based on their respective positions in addresses 3 and 5. For example, the least significant bit of searched address 3 may be compared with the least significant bit of address 5, the second least significant bit of searched address 3 may be compared with the second least significant bit of address 5, etc. Bit-wise comparison unit 11 can generate an output with a logic signal indicating whether the eight least significant bits of the searched address 3 are all equal to the eight least significant bits of address 5 of the load queue. As shown in FIG. 2, the output signal of bit-wise comparison unit 11 may be sent to an enabling input of bit-wise comparison unit 12. If bit-wise comparison unit 11 determines that the least significant bits of addresses 3 and 5 are all equal, then the output of bit-wise comparison unit 11 may have a high logic level that enables bit-wise comparison unit 12 to perform a second stage of comparison. Bit-wise comparison unit 12 may be a comparator that compares the addresses 3 and 5 in a second stage of comparison by performing a bit-wise comparison of the remaining twenty-four most significant bits of searched address 3 with the twenty-four most significant bits of address 5. If the twenty-four most significant bits match, bit-wise comparison unit 12 may output a signal with a high logic level. In this example, the outputs of bit-wise comparison units 11 and 12 are sent to first and second inputs of AND gate 13 which determines whether all of the bits of searched address 3 match all of the bits of address 5. If all of the bits match, AND gate 13 receives two logic high signals from bit-wise comparison units 11 and 12, and AND gate 13 may produce an output signal with a high logic level to indicate that addresses 3 and 5 match entirely. If bit-wise comparison unit 11 determines that the least significant bits do not match, then bit-wise comparison unit 11 outputs a signal with a low logic level to disable bit-wise comparison unit 5, which can advantageously reduce power consumption for the load queue search. When the subset of bits does not match in the first stage, the low logic level from bit-wise comparison unit 11 is received by the AND gate 13 which produces an output signal with a low logic level to indicate that the addresses do not match.

Comparison circuit 2 may include N versions of circuit 10 that each compare a respective address 5 of the load queue with the searched address 3. Advantageously, some of the addresses 5 in the load queue may be eliminated from the search by bit-wise comparison unit 11 during the first stage of comparison. In this example, for the addresses 5 that are eliminated from the search in the first stage, only eight bits of the address are compared rather than the full thirty-two bits. In some circumstances, a significant number of addresses in the load queue can be eliminated from consideration in the first stage of comparison, such as 95% of the addresses, for example. As a result, the amount of power needed to perform load queue searches can be reduced. In some circumstances, the dynamic power consumption of the load queue can be reduced by about 50%, however, the amount of power saved can be higher or lower depending on the particular circumstances.

A variety other implementations of comparison circuit 2 are possible. For example, although FIG. 2 is discussed in the context of a load queue, comparison circuit 2 may be used to compare addresses for a store queue, as discussed further below with respect to FIG. 4. Other variations are also possible. In the example of FIG. 2, circuit 10 performs two comparison stages, however, more than two comparison stages can be performed in some embodiments, such as three stages or more. Different numbers of bits may be compared, as the techniques described herein are not limited to comparing a particular number of bits in a stage. Furthermore, these techniques are not limited to comparing the least significant bits first, as any suitable bits may be compared first, and any suitable grouping of bits may be used.

Figure 3:
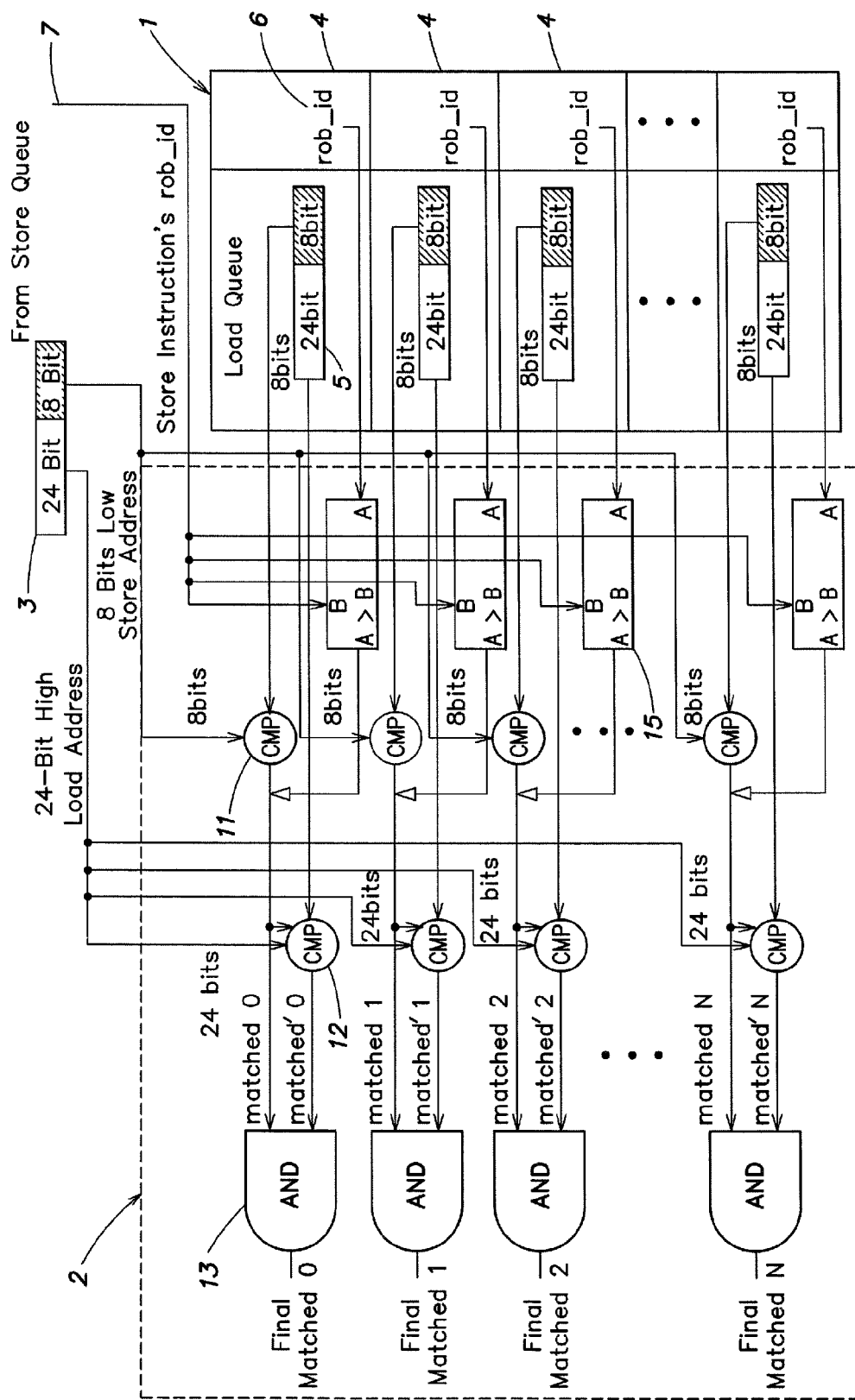
FIG. 3 shows the comparison circuit of FIG. 2 in greater detail.

FIG. 3 shows comparison circuit 2 in further detail, including a plurality of circuits 10 for comparing different addresses 5 in the load queue 1 with searched address 3. In some embodiments, each entry 4 in the load queue may have a corresponding circuit portion 10 for comparing the corresponding address 5 with the searched address 3. Each of these circuit portions 10 may be the same or they may be different, as the techniques described herein are not limited to using the same circuit portion 10 for each entry 4 in the load queue. In some embodiments, all of the addresses in the load queue may be compared with the searched address 3 in parallel, as shown in FIG. 3.

As shown in the example of FIG. 3, in some embodiments the searched address 3 may be received from the store queue of the microprocessor to check whether there are any load instructions that use the same memory address as a store instruction. The load queue 1 may be searched for any entries 4 having an address 5 that is the same as the searched address 3 of a store instruction in the store queue, using the techniques described herein to compare address 5 in the queue with searched address 3. As discussed above, load queue may searched in connection with performing any of a variety of techniques such as memory disambiguation and store-to-load data forwarding, for example.

FIG. 3 also shows that age information 6 (rob_id) can be used to filter the result of the address comparison, as discussed above with respect to FIG. 1. Comparison circuit 2 may receive the age information 7 for a store instruction having a corresponding entry in the store queue. An age comparison circuit 15 may check whether an entry in the load queue 1 is younger than the store instruction based on the age information 6 and 7. For example, when searching for mis-speculative load instructions, age comparison circuit 15 may filter out addresses that do not correspond to a load instruction that is younger than the store instruction. If the age (rob_id A) of the load queue entry is greater than the age of the store instruction (rob_id B), the age comparison circuit 15 may produce a logic signal that disables the output of first comparison unit 11. As a result, the output of the first comparison unit may be a low logic level that disables the second comparison unit 12. Thus, in this example, even if all of the subset of bits match, this entry may be filtered out of the search by the age comparison circuit 15. For entries that are not filtered out of the search, if the age of the load queue entry is less than the age of the store instruction then the comparison circuit 15 may produce a logic signal that enables the output of the first comparison unit 11.

Figure 4:
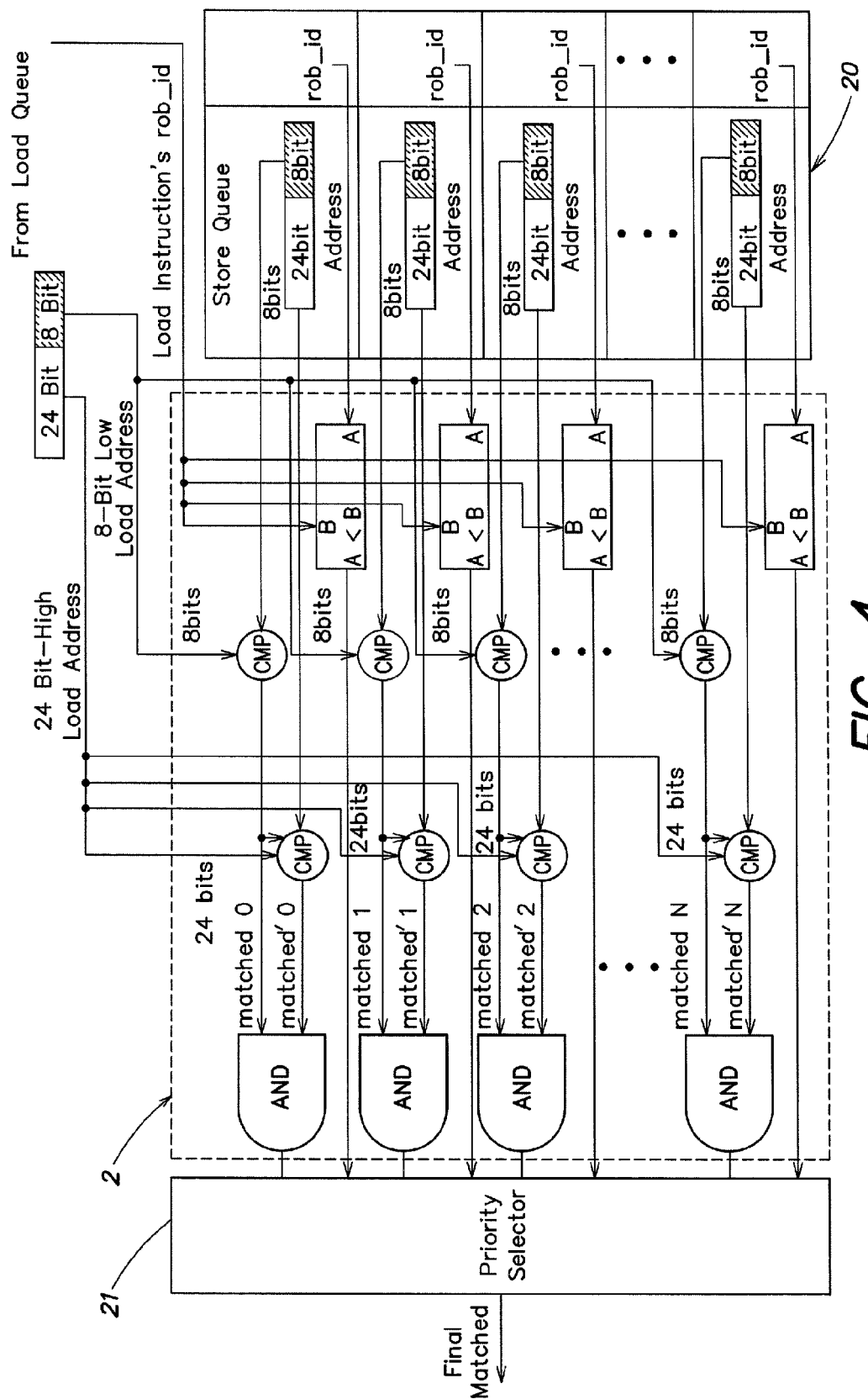
FIG. 4 shows a store queue and a comparison circuit that can search the store queue based on a memory address, according to some embodiments.

FIG. 4 shows an example of a store queue 20 that can be searched for an address using comparison circuit 2, according to some embodiments. Comparison circuit 2 may compare the addresses of store queue 20 with searched address 3 using similar techniques to those discussed above with respect to load queue 1 and comparison circuit 2. Store queue 20 may be searched in any of a variety of circumstances. For example, a search of store queue 20 may be performed when a target address for a load instruction is calculated. If a matching entry is found in store queue 20 for a later load instruction, the data from the store instruction can be forwarded to the load instruction to that the data is available more quickly. Because there may be more than one store instruction that accesses the same address, a priority selector 21 may be used to select the most recent store instruction older than the load instruction, based on age information.

As discussed above with respect to load queue 1, the use of comparison circuit 2 can save a significant amount of power in the store queue 20. In some circumstances, the dynamic power consumption of the store queue 20 can be reduced by about 24%. However the amount of power saved can be higher or lower depending on the particular circumstances.

This invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A comparison circuit that compares a first address with a second address, the second address being stored in a load queue and/or store queue of a microprocessor, the comparison circuit comprising:

a first comparison unit that compares a first subset of bits of the first address with a corresponding second subset of bits of the second address to produce a first comparison result indicating whether the first subset of bits is equal to the second subset of bits; and a second comparison unit coupled to the first comparison unit to receive the first comparison result, wherein the second comparison unit is enabled and disabled based on the first comparison result, wherein, when the second comparison unit is enabled, the second comparison unit compares a third subset of bits of the first address with a corresponding fourth subset of bits of the second address.

2. The comparison circuit of claim 1, wherein the microprocessor is a superscalar microprocessor configured to perform out of order execution, wherein the load queue and/or store queue is searched for any addresses equal to the first address using the comparison circuit.

3. The comparison circuit of claim 1, wherein the load queue and/or store queue is at least one memory structure of a microprocessor core dedicated to storing information associated with load operations and/or store operations executed by the microprocessor.

4. The comparison circuit of claim 1, wherein the load queue and/or store queue stores a third address, and the comparison circuit further comprises:

a third comparison unit that compares the first subset of bits of the first address with a corresponding fifth subset of bits of the third address to produce a third comparison result indicating whether the first subset of bits is equal to the fifth subset of bits; and a fourth comparison unit coupled to the third comparison unit to receive the third comparison result, wherein the fourth comparison unit is enabled and disabled based on the third comparison result, wherein, when the fourth comparison unit is enabled, the fourth comparison unit compares the second subset of bits of the first address with a corresponding sixth subset of bits of the third address.

5. The comparison circuit of claim 1, wherein the second comparison unit produces a second comparison result, and wherein the comparison circuit further comprises:

an AND gate that receives the first comparison result and the second comparison result and produces an output signal indicating whether the first address is equal to the second address.

6. The comparison circuit of claim 1, wherein the first subset of bits comprises a plurality of least significant bits of the first address.

7. The comparison circuit of claim 1, wherein the first subset of bits comprises no more than ¼ of a total number of bits in the first address.

8. The comparison circuit of claim 1, wherein the second address is a physical memory address accessed by the microprocessor in response to an associated load instruction or store instruction having a corresponding entry in the load queue and/or store queue.

9. The comparison circuit of claim 1, wherein the load queue and/or store queue comprises a plurality of entries having a plurality of addresses, wherein each of the plurality of addresses is compared with the first address.

10. The comparison circuit of claim 1, wherein,
the first comparison unit is a first comparator that performs a bit-wise comparison of the first and second subsets of bits; and the second comparison unit is a second comparator that performs a bit-wise comparison of the third and fourth subsets of bits.

11. The comparison circuit of claim 1, wherein,
the third subset of bits includes at least one bit of the first address that is not included in the first subset of bits.

12. The comparison circuit of claim 11, wherein,
the third subset of bits does not have any bits in common with the first subset of bits.

13. The comparison circuit of claim 1, further comprising an age comparison circuit configured to receive a first age associated with the first address and a second age associated with the second address and to output an age comparison result based on a comparison of the first age and second age.

14. The comparison circuit of claim 13, wherein an output of the age comparison circuit is configured to control an input of the second comparison unit so as to disable the second comparison unit based on the age comparison result.

15. The comparison circuit of claim 13, further comprising a priority selector that is configured to receive a plurality of address comparison results from a plurality of address comparison circuits and a plurality of age comparison results from a plurality of age comparison circuits, wherein an output of the age comparison circuit is coupled to an input of the priority selector.

16. The comparison circuit of claim 15, wherein the priority selector is further configured to select a store instruction from the store queue based upon the plurality of address comparison results and the plurality of age comparison results.

17. The comparison circuit of claim 15, wherein an output from the first comparison unit and an output from the second comparison unit are coupled to inputs of an AND gate and an output from the AND gate is coupled to an input of the priority selector.

18. The comparison circuit of claim 1, wherein the first address and second address are physical addresses.

19. A method of comparing a first address with a second address, the second address being stored in a load queue and/or store queue of a microprocessor, the method comprising:

comparing, at a first comparison unit, a first subset of bits of the first address with a corresponding second subset of bits of the second address;

receiving, at a second comparison unit that is coupled to the first comparison unit, a result from the first comparison unit; and when the result indicates that the first subset of bits is equal to the second subset of bits, comparing, at the second comparison unit, a third subset of bits of the first address with a corresponding fourth subset of bits of the second address.

20. The method of claim 19, wherein, when the first subset of bits is not equal to the second subset of bits, no other bits of the first and second addresses are compared.

21. The method of claim 19, wherein the load queue and/or store queue stores a third address, and the method further comprises:

comparing the first subset of bits of the first address with a corresponding fifth subset of bits of the third address; and when the first subset of bits is equal to the fifth subset of bits, comparing the second subset of bits in the first address with a corresponding sixth subset of bits of the third address.

22. The method of claim 19, wherein the load queue and/or store queue comprises a plurality of entries having a plurality of addresses, wherein each of the plurality of addresses is compared with the first address.

23. The method of claim 19, wherein the first subset of bits comprises no more than ¼ of a total number of bits in the first address.

24. The method of claim 19, the third subset of bits includes at least one bit of the first address that is not included in the first subset of bits.

25. The method of claim 19, further comprising:
receiving, at an age comparison unit, a first age of a load queue entry;
receiving, at the age comparison unit, a second age of a store queue entry; and
comparing, at the age comparison unit, the first age and the second age.

26. The method of claim 25, further comprising disabling the second comparison unit based upon an output from the age comparison unit.

27. The method of claim 25, further comprising:
providing an output from the age comparison unit to a priority selector; and
selecting a store instruction from the store queue based upon the output from the age comparison unit.

28. The method of claim 27, further comprising forwarding data from the selected store instruction to a load instruction.

* * * * *